United States Patent [19]

Seymour et al.

[11] Patent Number: 4,709,412
[45] Date of Patent: Nov. 24, 1987

[54] REMOTE CONTROL UNIT INTEGRATOR CONSOLE

[75] Inventors: Herbert E. Seymour, Chatsworth; Michael S. Robbins, Los Angeles, both of Calif.

[73] Assignee: Xantech Corporation, Sylmar, Calif.

[21] Appl. No.: 900,540

[22] Filed: Aug. 26, 1986

[51] Int. Cl.⁴ .............................................. H04B 9/00
[52] U.S. Cl. ................................... 455/603; 340/696; 455/151; 455/352
[58] Field of Search ............... 455/128, 617, 618, 603, 455/151, 352, 600, 601; 340/825.72, 696; 358/194.1; D14/84, 85; 206/328

[56] References Cited

U.S. PATENT DOCUMENTS

| 2,497,931 | 2/1950 | Daly . | |
|---|---|---|---|
| 2,566,830 | 9/1951 | Goldsmith . | |
| 2,634,652 | 4/1953 | Barth . | |
| 4,229,765 | 10/1980 | Sanger | 358/188 |
| 4,267,606 | 4/1981 | Stelter et al. | 455/603 |
| 4,426,738 | 1/1984 | Sato | 455/603 |
| 4,509,211 | 4/1985 | Robbins | 455/603 |
| 4,527,204 | 7/1985 | Kozakai et al. | 358/194.1 |
| 4,539,711 | 9/1985 | Harger | 358/194.1 |
| 4,627,107 | 12/1986 | Hohfeld et al. | 455/89 |

FOREIGN PATENT DOCUMENTS 2146813  4/1985  United Kingdom ............... 455/603

Primary Examiner—Joseph A. Orsino, Jr.
Attorney, Agent, or Firm—Wm. Bruce Day

[57] ABSTRACT

A remote control unit integrator console includes a console tray to hold a plurality of infrared remote control transmitter units of various sizes and shapes. The tray includes a front hood which houses a mechanism for transferring infrared signals from the control units toward the appliances to be controlled. In one embodiment the infrared transfer mechanism includes a set of reflectors capable of efficiently reflecting infrared energy. In another embodiment, the infrared transfer mechanism includes infrared photo detectors connected to amplifiers which drive either a set of infrared emitters positioned in a diverging array or a single infrared emitter mounted in such a manner as to be pivotable. In still another embodiment, the coded infrared signals from the infrared remote control units are converted to radio signals which are received and reconverted to coded infrared signals by receiver units close to the controlled appliances for control of the respective appliances.

22 Claims, 9 Drawing Figures

REMOTE CONTROL UNIT INTEGRATOR CONSOLE

FIELD OF THE INVENTION

The present invention relates to remote control devices and, more particularly, to a console housing a plurality of diverse types of infrared control units and including means for transferring infrared signals from the units to the appliances normally controlled by the units.

BACKGROUND OF THE INVENTION

There has been a proliferation of audio and video devices for the home which are controlled by hand held infrared remote control units. The infrared controlled devices include television sets, cable television converters, video tape recorders, position controllers for television satellite antennas, laser disk players, and the like. In general, the remote control transmitter units have keys for the selection of a television channel, for example, causing the transmitter to emit an infrared signal which is pulse coded according to the keys pressed. If the transmitter unit is properly aimed toward the controlled appliance, an infrared receiver on the appliance receives the coded infrared signal, decodes same, and effects the desired action.

The remote controller units are generally small, about the size of a small hand held calculator. Because of their size the controller units are easy to misplace by falling between cushions on a sofa or by someone walking out of the viewing room with the controller unit in their pocket. Since television viewing rooms are often darkened, use of the remote controller units is difficult because most units are not self-illuminating. The infrared beam from such controller units is fairly narrow such that they must be held steady and pointed directly at the infrared receiver for proper operation. When a viewer has several devices which are infrared remote controlled, the various controller units clutter cocktail or end tables where they are normally placed.

SUMMARY OF THE INVENTION

The present invention is directed to overcoming the above described problems and thereby facilitate the use of infrared controlled appliances. A tray or console is provided in which the infrared control transmitter units are placed and held therein by means such as hook and loop fastener strips. An illuminator such as a light bulb is mounted in the console and is connected through a switch to a timer to illuminate the controller units in the console for short periods of time. The console includes means to transfer the infrared signals from the control units to the controlled appliances. In one embodiment of the present invention, the transfer means is passive and includes a set of mirrors or reflectors capable of efficiently reflecting infrared energy of the wavelength commonly employed in such control units from the control units toward the controlled appliances.

In an active embodiment of the present invention, the infrared transfer means includes one or more infrared photo detectors, amplifiers, and a plurality of infrared light emitting diodes (LED's). The LED's are positioned in a diverging array to widen the infrared output beam and facilitate placement and aiming of the console. Reflectors are positioned about the infrared photo detectors such that the infrared signals from the controller units may be received, regardless of the lateral position of the controller units in the console tray. Alternatively, a single infrared emitter mounted in a pivotally mounted head for selective aiming can be employed instead of the diverging array of infrared emitters.

The present invention includes passive embodiments of the integrator console in which the infrared signals are transferred by entirely optical means such as infrared efficient reflectors. The infrared reflectors may either be fixed in position or adjustable and may transfer the infrared signals from the control transmitter units in a forward direction or in a lateral direction.

Lastly, the present invention includes an embodiment of the integrator console in which the infrared signals are converted to another medium such as radio signals or ultrasonic signals for less directional transmission toward the controlled appliances. The radio or ultrasonic signals are reconverted to infrared signals for control of the appliances to avoid the necessity of modifying the circuitry of the appliances.

OBJECTS OF THE INVENTION

The principal objects of the present invention are: to provide an integrator console to organize a plurality of infrared remote controller units to facilitate their use; to provide such a console which houses a plurality of infrared remote controller units of diverse sizes, shapes, and coding schemes; to provide such a console in which the controller units are removably attached; to provide such a console which transfers the infrared signals from the controller units to their respective controlled appliance; to provide a passive embodiment of such a console in which the infrared transfer mechanism is reflection from a set of reflectors capable of efficiently reflecting infrared energy; to provide such a passive embodiment of the console employing adjustably positionable infrared reflectors; to provide an active embodiment of such a console in which the infrared transfer means includes infrared photo detectors, amplifiers, and infrared emitters such that the coded infrared signals are transferred optoelectronically; to provide such an active console including reflectors positioned about the infrared detectors such that the controller units may be placed at any position across the console without degradation of performance; to provide such an active console including a plurality of infrared emitters positioned in a diverging array to facilitate the placement of the console with respect to the controlled appliances; to provide a modified active embodiment of the console employing a single infrared emitter mounted in an adjustably pivotable head structure; to provide a further modified active embodiment of the console in which the infrared signals are converted to another medium, such as radio signals, for transmission and reconverted to infrared signals at the controlled applicance; to provide such a console including an illuminator to light the controller units for convenient use in darkened environments; and to provide such a remote control unit integrator console which is economical to manufacture, convenient and efficient in use, and which is particularly well adapted for its intended purpose.

Other objects and advantages of the present invention will become apparent from the following description taken in conjunction with the accompanying drawings wherein are set forth, by way of illustration and example, certain embodiments of this invention.

The drawings constitute a part of the specification, include an exemplary embodiment of the present invention, and illustrate various objects and features thereof.

DETAILED DESCRIPTION OF THE PREFERRED EMBODIMENTS

Figure 1:
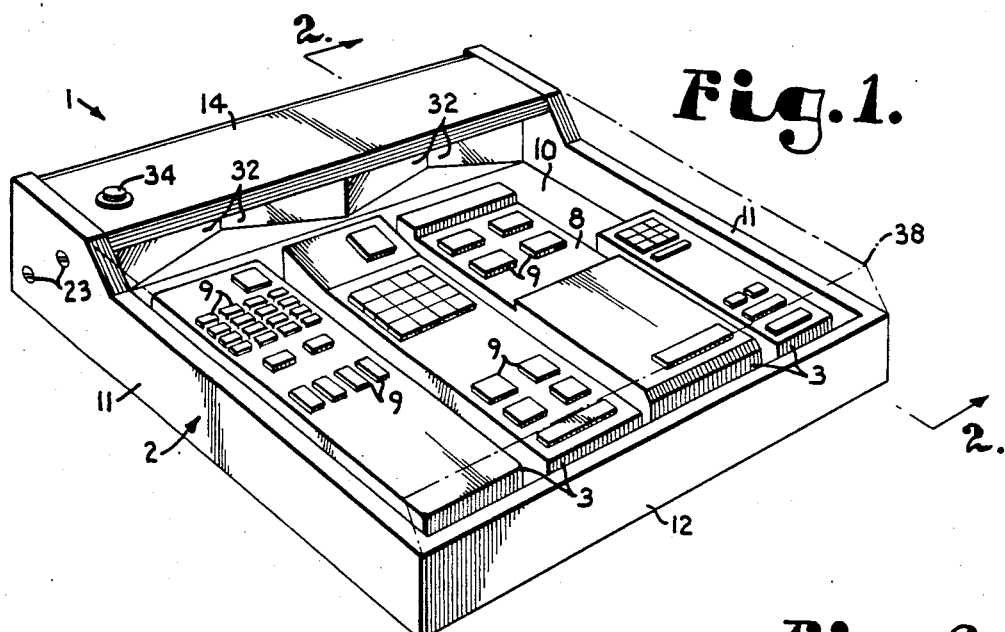
FIG. 1 is a perspective view of a remote control unit integrator console according to the present invention with a plurality of infrared remote control units positioned therein.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
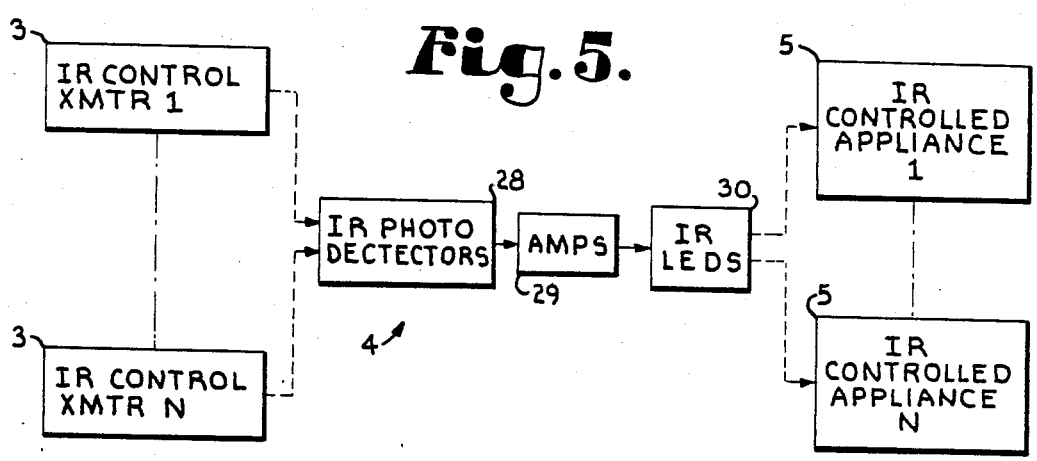
FIG. 5 is a simplified block diagram illustrating the optoelectronic infrared transfer means.

Referring to the drawings in more detail:

The reference numeral 1 generally designates a remote control unit integrator console embodying the present invention. The console 1 generally includes a console tray or housing 2 to hold and organize a plurality of infrared control transmitter units 3 of various sizes and shapes. The tray 2 also houses an infrared transfer means 4 to receive coded infrared signals from the control units 3 and transfer the signals toward infrared controlled appliances 5 (FIG. 5). In a preferred embodiment of the console 1, the infrared transfer means 4 includes electronic circuitry cooperating with optoelectronic elements. In a passive embodiment, the infrared transfer means 4 includes a set of cooperating reflectors.

Figure 2:
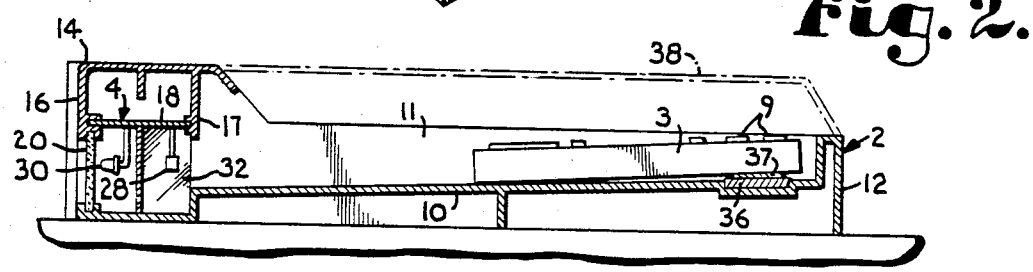
FIG. 2 is a sectional view taken on line 2—2 of FIG. 1 and illustrates details of the structure of the console.
Figure 3:
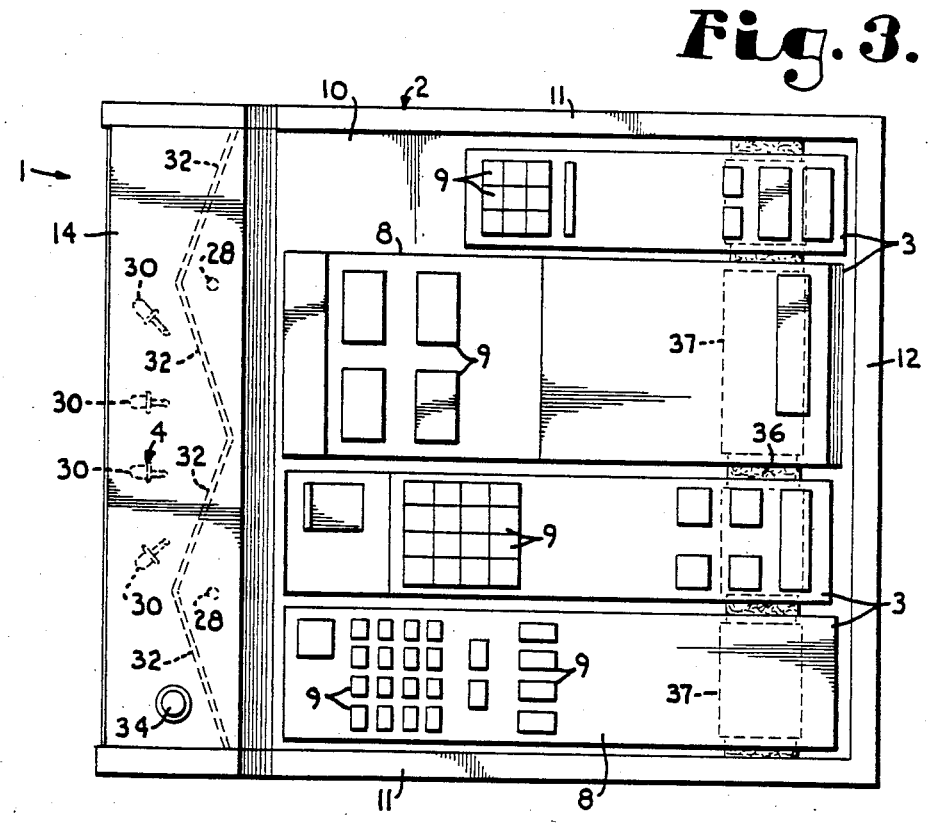
FIG. 3 is a top plan view of the console illustrating reflectors for the infrared photo detectors and the diverging array of the infrared emitters in phantom.

Referring to FIGS. 1-3, the infrared control transmitter units 3 are conventional devices including a control unit case 8 on which are mounted a plurality of buttons or keys 9 which may be operated in certain combinations to cause remote actions to occur such as the changing of channels in a remote controlled television set, the change of position of a television satellite antenna, and similar types of actions depending on the appliance controlled. Operation of combinations of the keys 9 causes the entry of codes into circuitry (not shown) within the control units 3 which are used to pulse modulate a beam of infrared "light" or electromagnetic energy which is emitted from the control units 3.

There are a number of codes and coding schemes that are employed in infrared remote controlled appliances and which are determined by the particular circuitry or chip sets employed by the manufacturers. The infrared energy, as employed in such control units 3, is invisible to the human eye, typically having a wavelength of eight hundred to nine hundred nanometers. When a control unit 3 is aimed or pointed at a compatible appliance 5, the modulated infrared beam is received and decoded, and the control action represented by the particular code is effected in the controlled appliance 5. As illustrated, the infrared control units 3 are manufactured in various sizes and shapes.

The console tray 2 includes a floor 10, side walls 11, and a rear end wall 12 configured to confine a plurality of conventionally sized infrared control units 3 therein. The console tray 2 should be long enough to accommodate the length of the longest commonly available control units 3. The floor 10, side walls 11, and rear wall 12 may be integrally formed as of a plastic by molding. Another contemplated material is wood, formed in suitable strips or sheets. A front end of the console tray 2 is provided with means forming a hood 14 which encloses the infrared transfer means 4. In the illustrated tray 2, the hood 14 is formed of an aluminum extrusion.

Figure 4:
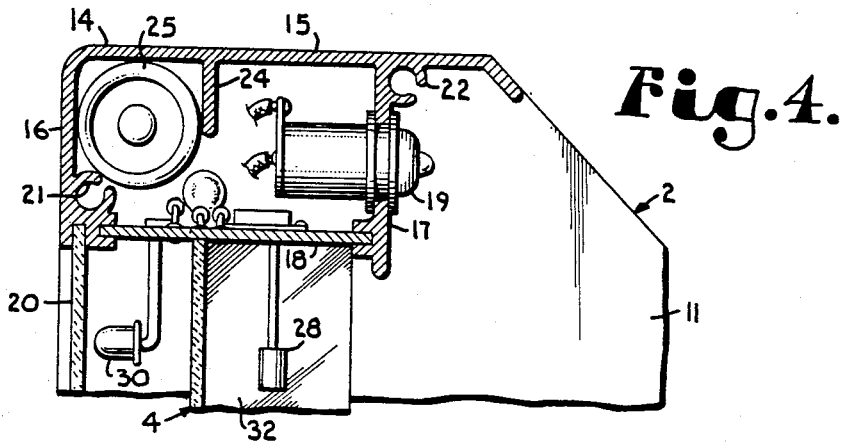
FIG. 4 is an enlarged sectional view similar to FIG. 2 and illustrates details of the optoelectronic infrared transfer means.

Referring to FIG. 4, the hood 14 is substantially channel shaped including a web or top wall 15 and depending flanges 16 and 17. The flange 16 forms a front wall of the hood 14 while the flange 17 forms a middle wall. A circuit board 18 is affixed between the flanges 16 and 17 and has the circuit elements of the infrared transfer means 4 mounted thereon. The middle flange 17 has an illuminator 19 mounted therein which may be one or more small incandescent lamps or light emitting diodes, preferably emitting white light. An infrared window 20 extends between the front flange 16 and the floor 10 and between the side walls 11. The window 20 is a sheet of glass or plastic which is transparent to infrared energy of the wavelength employed and, in the illustrated console 1, has a red color. The hood 14 includes front and middle C-shaped beads 21 and 22 configured to receive fasteners 23 (FIG. 1), such as self-tapping screws, to attach the hood 14 to the side walls 11 of the console tray 2. The front bead 21, in cooperation with a short inner flange 24 forms a channel to receive batteries 25 which power the circuitry of the infrared transfer means 4 and the illuminator 19.

Referring to FIGS. 3, 4, and 5, the preferred infrared transfer means 4 includes infrared photo detectors 28, amplifiers 29, and infrared emitters 30. The infrared photo detectors 28 may be silicon photodiodes, PIN diodes, or photo transistors which have a suitable response to infrared energy of the required wavelength or which can be efficiently filtered optically for such response. The infrared emitters 30 are preferably infrared light emitting diodes (LED's) that are similar to the types of infrared emitters (not shown) employed in the infrared control units 3. The amplifiers 29 are substantially high audio frequency amplifiers with a response in the range of twenty to one hundred kilohertz. The amplifiers 29 form a single multi-stage channel which add the electrical signals analogous to the infrared signals received by the infrared detectors 28 and supply the drive current to the paralleled infrared emitters 30. Alternatively, other circuit configurations could be employed such as multiple channels each consisting of an infrared detector 28, amplifiers 29, and an infrared emitter 30.

Infrared reflectors 32 are positioned around the infrared photo detectors 28 to widen the acceptance pattern of the detectors 28 to infrared signals from the control units 3. The reflectors 32 illustrated in FIG. 3 are in a W-shaped pattern and positioned about a pair of laterally spaced infrared photo detectors 28. Other configurations for the infrared photo detectors 28 and reflectors 32 are comtemplated, such as spherical and parabolic patterns or infrared responsive light guides for the reflectors 32 and the use of a greater number of detectors 28. The objective of the configuration of detectors 28 and reflectors 32 is to provide for response of the infrared photo detectors 28 to infrared signals from the control units 3 regardless of their position across console tray 2.

The reflectors 32 are preferably front surfaced mirrors, but they may be rear surfaced mirrors if the glass or plastic support material is sufficiently infrared transparent. There is no particular requirement that the reflectors 32 be entirely distortion free since a somewhat diffused reflection might ease the configuration requirements of the reflectors 32 to some degree. Alternatively, other infrared-efficient elements could be substituted for the reflectors 32, such as suitable lenses, prisms, Fresnel lenses, or the like, either alone or in combination. All that is required is that a small amount of the infrared beam output from any one of the control units 3 be routed to at least one of the infrared photo detectors 28. The electrical signal from the infrared detectors 28 which results from that small amount of infrared energy is amplified by the amplifiers 29 to a level which can drive the infrared emitters 30 at the desired output level.

The infrared emitters 30 are preferably positioned in a diverging array to widen the pattern of infrared energy emanating therefrom and thereby ease the positioning or aiming requirements of the console 1 with respect to the infrared controlled appliances 5 and vice versa. As illustrated in FIG. 3, the infrared transfer means 4 includes four infrared emitters 30, the two middle emitters being directed forwardly and the two end emitters diverging at about forty-five degrees. Alternatively, different numbers of infrared emitters 30 in combination with reflectors or optical diffusing elements could also be employed. The infrared emitters 30 are driven in unison, as by parallel connection to the amplifiers 29, in accordance with the pulses with which the original infrared signal from one of the control units 3 was encoded.

The console 1 is provided with the illuminator 19 to selectively light the control units 3 for convenience when the console 1 is used in a darkened environment. Preferably, the illuminator 19 is connected through a timer (not shown) and a light switch 34 which cooperate to activate the illuminator 19 for a short period of time, such as five to ten seconds. The switch 34 may be a "touch switch" which operates on conductive or capacitive principles; and the timer may involve a one-shot or monostable multivibrator. If the illuminator 19 has been extinguished before the user has completed the desired control action, the switch 34 may be repeatedly actuated to reactivate the illuminator 19.

It is preferred that the infrared control transmitter units 3 be held within the console tray 2. In the illustrated console 1, a hook and loop attachment set is employed for this purpose. Such attachment sets are available under the trademark name Velcro (American Velcro, Inc. of Manchester, N.H.). Referring to FIG. 2, one element, such as a hook strip 36 is attached to the floor 10 of the console tray 2, and individual loop strips 37 having adhesive backing are provided for attachment to the control units 3. The control units 3 may then be removed from the console 1 if desired, or the positions within the console 1 may be changed. Alternatively, other means may be employed for attaching the control units 3 within the console 1. The console 1 may also be provided with a removable dust cover 38 to prevent dust accumulation on the control units 3 and to neaten the appearance of the console 1.

In operation, one or more infrared control transmitter units 3 are placed in the tray 2 of the integrator console 1 with the infrared beam emitting ends of the control units 2 directed toward the hood 14. The console 1 is placed on a coffee, cocktail, or end table in the viewing room with the window 20 generally directed toward the appliances 5 to be controlled. Although there is the possibility that appliances to the sides and rear of the console 1 can be effectively controlled by reflections of the signals from surfaces within the viewing room, more reliable operation occurs with the appliances 5 toward the front of the console 1. When an appliance 5 is to be controlled, the user operates the keys 9 on the associated control unit 3. The control unit 3 emits an encoded infrared signal which is detected by the infrared photo detectors 28. The amplifiers 29 transfer this signal to the infrared emitters 30 which emit a strengthened and diverged infrared signal which is received and decoded by the associated appliance 5. Between control actions and when not in use, the dust cover 38 may be placed over the console 1. Under some circumstances, it might be desirable to include an on/off switch (not shown) on the console 1 to completely deactivate the circuitry therein when the console 1 is not to be used for an extended period of time. However, such an on/off switch is not essential if low power circuitry elements are employed in the infrared transfer means 4.

Figure 8:
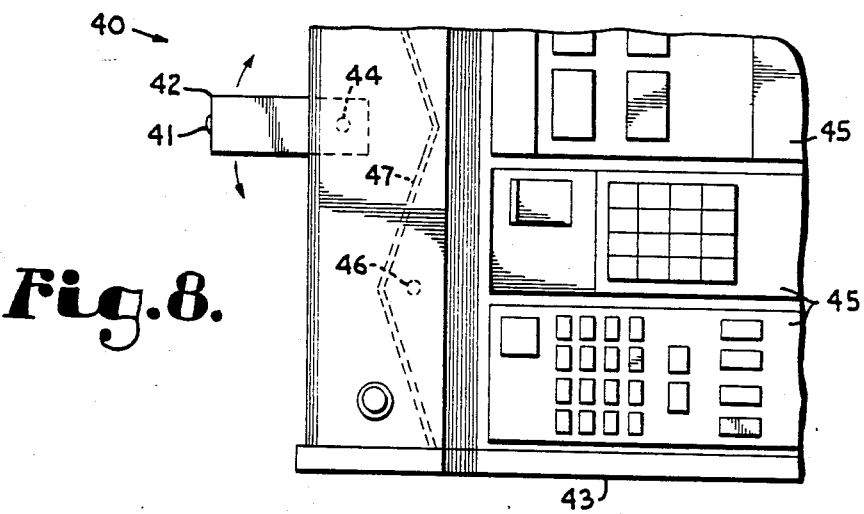
FIG. 8 is a fragmentary plan view of modified embodiment of a console employing optoelectronic infrared signal transfer in which a single infrared emitter is mounted in a pivotable head structure.

FIG. 8 illustrates a first modified embodiment 40 of the remote control unit integrator console in which an infrared emitter 41 is mounted in a head 42 which is pivotally connected at 44 to the console tray 43. The tray 43 is sized to removably receive a plurality of infrared control transmitter units 45 and has infrared photo detector 46 positioned therein to receive the infrared beams from the transmitter units 45. A reflector arrangement 47 is positioned about the infrared detectors 46 to liberalize the positioning requirements of the transmitter units 45 in the tray 43. The console 40 has amplifiers (not shown) connected between the infrared detectors 46 and the infrared emitter 41 to drive same. The console 40 employs a single infrared emitter 41 instead of the array of infrared emitters 30 of the console 1.

The pivotal connection 64 between the head 42 and the tray 43 allows the user a great deal of flexibility in the placement of the console 40 by allowing the user to selectively aim the infrared emitter 61 toward an infrared controlled appliance (not shown). In the console 40, there is no need for a window similar to the window 20 of the console 1. In its place, a suitable cavity (not shown) may be provided, into which the head 42 is pivoted for dust protection when the console 40 is not in use. The console 40 is particularly well adapted for use in large rooms where the available surfaces would not be adequate for reflecting the infrared signals toward the controlled appliances. In other respects, the console 40 is substantially similar to the console 1.

Figure 6:
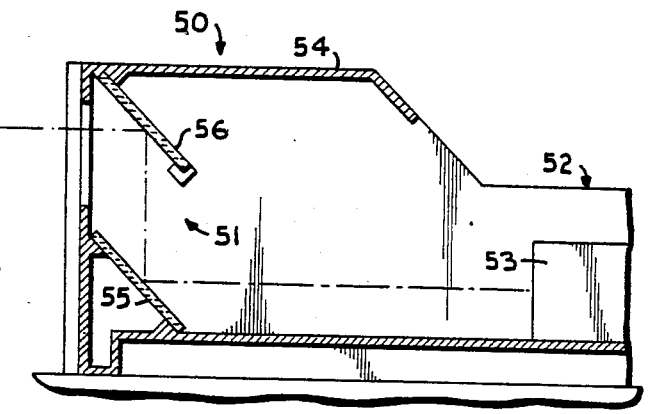
FIG. 6 is an enlarged sectional view of a modified embodiment of the console according to the present invention in which the coded infrared signals are transferred by means of a set of reflectors.

FIG. 6 illustrates a second modified embodiment of the remote control unit integrator console according to the present invention. The reflector console 50 differs from the console 1 only in the use of passive elements in an infrared transfer means 51 thereof. The reflector console 50 includes a console tray 52 which holds a plurality of infrared control transmitter units 53. A front end of the console 50 includes a hood 54 in which the infrared transfer means 51 is mounted. As illustrated, the transfer means 51 includes a set of reflectors 55 and 56 which are preferably front surfaced mirrors. An encoded infrared signal from one of the control units 53 impinges on the lower reflector 55, is reflected upwardly toward the upper reflector 56, and from there forwardly toward a respective infrared controlled appliance (not shown). Although the finally emitted infared beam may be widened or diffused according to the characteristics of the reflectors 55 and 56, there is no power gain in the infrared signal. For this reason, the infrared transfer means 51 may be described as a passive infrared transfer means. The console 50 may incorporate an illuminator (not shown) similar in operation to the illuminator 19 of the console 1. In other operational and use aspects, the console 50 is substantially similar to the console 1.

Figure 7:
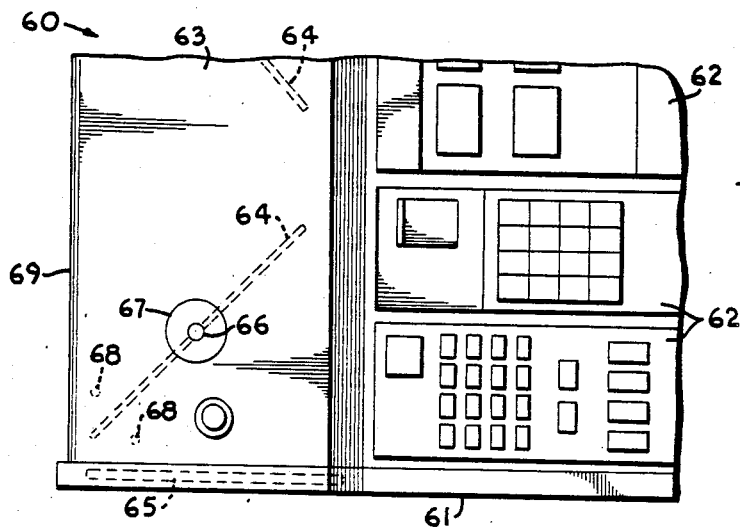
FIG. 7 is a fragmentary plan view of a modified embodiment of a console according to the present invention in which the infrared signals are transferred laterally by pivotally adjustable reflectors.

FIG. 7 illustrates a third modified embodiment 60 of a remote control unit integrator console. The console 60 employs optical elements for passive infrared signal transfer as does the console 50. A console tray 61 is provided in which a plurality of infrared remote control transmitter units 62 are removably placed. The console tray 61 has a front end hood 63 which is expanded in comparison to the size of the hood 14 of the console 1. The hood 63 accommodates one or more infrared reflectors 64 which are mounted in angular relation to the infrared beam direction of the transmitter units 62. The hood 63 has side windows 65 which are infrared transparent. Preferably, the reflectors 64 are positioned on shafts 66 which are pivotally mounted within the hood 63. Knobs 67 are affixed to the shafts 66 to allow manual adjustment of the angular positions of the reflectors 64. Reflector stops 68 may also be provided to limit the degree of movement of the reflectors 64.

The angular positions of the reflectors 64 in cooperation with the side windows 65 cause the infrared signals from the transmitter units 62 to be reflected laterally of the console 60 in contrast to the straight ahead signal reflection provided by the console 50 of FIG. 6. This allows the console 60 to be placed on an end table with a front end 69 directed laterally of a viewer seated beside the end table to control an appliance positioned forward of the viewer. Alternatively, the console 60 may be oriented with the front end 69 facing forwardly, as on a coffee table, to control appliances positioned laterally of the viewer. In other respects, the console 60 is substantially similar to the console 50.

Figure 9:
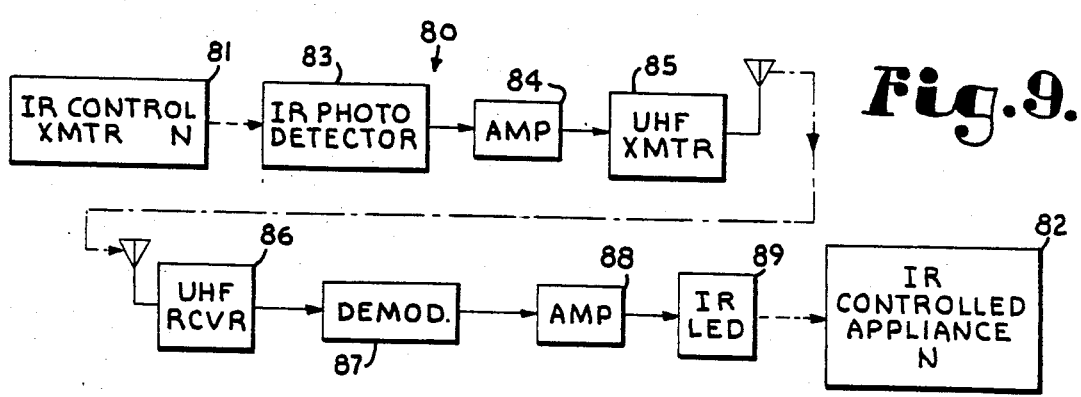
FIG. 9 is a block diagram of an infrared signal transfer arrangement for a console according to the present invention in which the infrared signals are converted to radio signals for transmission and reconverted to infrared signals at the controlled appliance.

FIG. 9 diagrammatically illustrates a modified infrared signal transfer arrangement 80 for a remote control unit integrator console according to the present invention. In general, the arrangement 80 converts an infrared signal from an infrared control transmitter unit 81 to a radio signal, radio transmits the radio signal, receives the radio signal near an infrared controlled appliance 82 associated with the infrared transmitter unit 81, converts the radio signal back to an infrared signal, and emits the infrared signal toward the controlled appliance 82. The principal advantage of the infrared/radio arrangement 80 over the optical and optoelectronic infrared transfer arrangements employed in the consoles 1, 40, 50, and 60 is the relative lack of directionality of radio waves over a short distance compared to infrared "light" waves. Thus, the infrared/radio arrangement 80 allows even greater flexibility in the placement and orientation of a console than the optical and optoelectronic infrared transfer arrangements of the other embodiments of the consoles of the present invention.

The transfer arrangement 80 includes one or more infrared photo detectors 83 positioned in such a manner as to receive infrared signals from a plurality of infrared control transmitter units 81. The infrared detectors 83 are connected to a console amplifier or amplifier stages 84 to generate console electrical signals analogous to the infrared signals received from the transmitter units 81. The console electrical signals are used to modulate or encode a radio frequency carrier of a radio transmitter 85. The modulation scheme may be any suitable type of modulation, such as amplitude modulation, frequency shift keying, pulse modulation, digital encoding, or the like which avoids unwanted interference and control errors. The radio transmitter 85 may be operated at any legally permissible frequency and power output. Preferably, the radio transmitter 85 is of the type used in such applications as garage door openers which operate in the ultra high frequency (UHF) range of about 300 to 400 megahertz.

The infrared/radio transfer arrangement 80 includes a radio receiver 86 which is compatible with the radio transmitter 85. The radio receiver 86 tunes the radio signal from the radio transmitter 85 and may include radio frequency amplifiers to increase the sensitivity of the receiver 86. The receiver 86 is connected to a demodulator circuit 87 which recovers a receiver electrical signal similar to the console electrical signal. The receiver electrical signal is power amplified by receiver amplifiers 88 and used to drive one or more infrared emitters 89, such as infrared LED's, positioned in close proximity to or aimed toward the infrared controlled appliances 82. The infrared emitters 89, thus, emit infrared signals encoded in a manner similar to that of the original infrared signals emitted by the infrared control transmitters 81 to control the appliances 82.

The transmitter components of the transfer arrangement 80 may be housed in a console tray (not shown) similar to the console tray 2 of the console 1 without the need for the infrared transparent window 20. Because of the operating frequency of the radio transmitter 85, the required antenna (not shown separately) would be very short, such as about a six inch length of conductor, which could be incorporated into the structure of the console in which the arrangement 80 is housed. The receiver components of the arrangement 80 may be enclosed in a single housing with a plurality of infrared emitters 89 mounted in aimable heads (not shown) similar to the head 42 of FIG. 8. Alternatively, multiple receiver units could be employed, each employing a single infrared emitter 89 and each receiver unit being associated with a single controlled appliance 82.

In the transfer arrangement 80, the infrared signals are converted to radio signals for transmission and reconverted back to infrared signals at the controlled appliances. It would also be possible and advantageous in some circumstances to implement the infrared signal conversion process using ultrasonic signals as the transmitted medium. In such an ultrasonic arrangement, the radio transmitter and receiver components would be replaced with corresponding ultrasonic components. Therefore, the present invention is also intended to encompass the use of ultrasonic energy as a conversion medium as a functional equivalent of the use of radio energy as described above.

It is to be understood that while certain forms of the present invention have been described and illustrated herein, it is not to be limited to the specific forms or arrangement of parts described and shown.

What is claimed and desired to be secured by Letters Patent is as follows:

1. An infrared remote control unit integrator console for housing a plurality of hand held infrared control transmitter units of not necessarily uniform size, shape, and coding scheme which are operable to selectively emit infrared signals toward infrared controlled appliances having respectively compatible infrared receivers associated therewith, said console comprising:
   (a) console housing means sized to receive a plurality of infrared control transmitter units of not necessarily uniform size and shape therein; and
   (b) infrared transfer means at least a portion of which is mounted within said housing means to receive an infrared signal from any infrared control transmitter unit positioned in said housing means and operatively transfer said infrared signal toward a respective infrared controlled appliance to be controlled by said infrared control transmitter unit.

2. A console as set forth in claim 1 wherein said infrared transfer means includes:
   (a) infrared energy reflector means positioned within said housing means to receive an infrared signal from an infrared control transmitter unit positioned in said housing means and reflect same toward a respective infrared controlled appliance.

3. A console as set forth in claim 1 wherein said infrared transfer means include:
   (a) a set of mirrors capable of efficiently reflecting infrared energy positioned within said housing means in such a manner as to reflect an infrared signal from an infrared control transmitter unit in said housing means toward an infrared controlled appliance when said housing means is aimed generally toward such an infrared controlled appliance.

4. A console as set forth in claim 1 wherein said infrared transfer means includes:
   (a) at least one infrared reflector pivotally mounted with respect to said housing means and selectively rotatable to receive an infrared signal from an infrared control transmitter unit positioned in said housing means and reflect same toward a respective infrared controlled appliance.

5. A console as set forth in claim 1 wherein said infrared transfer means includes:
   (a) an infrared photo detector positioned within said housing means to receive an infrared signal from an infrared control transmitter unit within said housing means and generate an electrical signal analogous to said infrared signal;
   (b) amplifier means connected to said infrared photo detector and cooperating therewith to amplify said electrical signal; and
   (c) an infrared emitter device connected to said amplifier means and emitting an amplified infrared signal toward a respective infrared controlled appliance in response to said electrical signal.

6. A console as set forth in claim 5 including:
   (a) detector reflector means having such a shape and being so positioned on said housing means with respect to said infrared photo detector as to create a wide acceptance pattern of said infrared photo detector to infrared signals from an infrared control transmitter unit within said housing means.

7. A console as set forth in claim 5 wherein:
   (a) said infrared emitter device is mounted in an infrared emitter head structure pivotally connected to said housing means and pivotable to selectively aim said infrared emitter device toward an infrared controlled appliance.

8. A console as set forth in claim 5 including:
   (a) a plurality of infrared emitter devices connected to said amplifier means, driven in unison by said amplifier means, and positioned in diverging relation to emit said amplified infrared signal in a wide diverging pattern toward respective appliances controlled by infrared control transmitter units within said housing means.

9. A console as set forth in claim 1 including:
   (a) illuminator means positioned within said housing means and selectively operable to illuminate an infrared control transmitter unit within said housing means.

10. A console as set forth in claim 1 wherein said infrared transfer means includes:
    (a) an infrared photo detector positioned within said housing means to receive an infrared control signal from an infrared control transmitter within said housing means and generate a console electrical signal analogous to said infrared control signal;
    (b) console amplifier means connected to said infrared photo detector and cooperating therewith to amplify said console electrical signal;
    (c) radio transmitter means connected to said console amplifier means, modulating a radio signal with said console electrical signal, and transmitting the modulated radio signal;
    (d) radio receiver means separated from said housing means, receiving said modulated radio signal, and demodulating same to recover a receiver electrical signal analogous to said console electrical signal;
    (e) receiver amplifier means connected to said radio receiver means and amplifying said receiver electrical signal; and
    (f) an infrared emitter device connected to said receiver amplifier means, converting said receiver electrical signal to an appliance control infrared signal analogous to said infrared control signal, and emitting said appliance control infrared signal toward an appliance associated with said infrared control transmitter within said housing means.

11. A console as set forth in claim 1 including:
    (a) transmitter unit attachment means within said housing means to removably attach a plurality of infrared control transmitter units within said housing means.

12. A console as set forth in claim 11 wherein said transmitter unit attachment means includes:
(a) one component of a hook and loop adhesive set positioned on one of said housing means and at least one infrared control transmitter unit; and
(b) the other component of a hook and loop adhesive set positioned on the other of said housing means and at least one infrared control transmitter unit.

13. An infrared remote control unit integrator console to house a plurality of hand held infrared control transmitter units of not necessarily uniform size, shape, and coding scheme which are operable to selectively emit infrared signals toward infrared controlled appliances having respectively compatible infrared receivers associated therewith, said console comprising:
(a) console housing means sized to receive a plurality of infrared control transmitter units of not necessarily uniform size and shape therein;
(b) transmitter unit attachment means within said housing means to removably attach a plurality of infrared control transmitter units within said housing means;
(c) an infrared photo detector positioned within said housing means to receive an infrared signal from an infrared control transmitter unit within said housing means and generate an electrical signal analogous to said infrared signal;
(d) amplifier means connected to said infrared photo detector and cooperating therewith to amplify said electrical signal;
(e) an infrared emitter device connected to said amplifier means and emitting an amplified infrared signal toward a respective infrared controlled appliance in response to said electrical signal; and
(f) detector reflector means having such a shape and being so positioned on said housing means with respect to said infrared photo detector as to create a wide acceptance pattern of said infrared photo detector to infrared signals from an infrared control transmitter unit within said housing means.

14. A console as set forth in claim 13 wherein:
(a) said infrared emitter device is mounted in an infrared emitter head structure pivotally connected to said housing means and pivotable to selectively aim said infrared emitter device toward an infrared controlled appliance.

15. A console as set forth in claim 13 including:
(a) more than one infrared photo detector positioned within said housing means and spaced from said detector reflector means.

16. A console as set forth in claim 13 including:
(a) a plurality of infrared emitter devices connected to said amplifier means, driven in unison by said amplifier means, and positioned in diverging relation to emit said amplified infrared signal in a wide diverging pattern toward respective appliances controlled by infrared control transmitter units within said housing means.

17. A console as set forth in claim 13 including:
(a) illuminator means positioned within said housing means and selectively operable to illuminate an infrared control transmitter unit within said housing means.

18. A console as set forth in claim 13 wherein said transmitter unit attachment means includes:
(a) one component of a hook and loop adhesive set positioned on one of said housing means and at least one infrared control transmitter unit; and
(b) the other component of a hook and loop adhesive set positioned on the other of said housing means and at least one infrared control transmitter unit.

19. An infrared remote control unit integrator console to house a plurality of hand held infrared control transmitter units of not necessarily uniform size, shape, and coding scheme which are operable to selectively emit infrared signals toward infrared controlled appliances having respectively compatible infrared receivers associated therewith, said console comprising:
(a) console housing means sized to receive a plurality of infrared control transmitter units of not necessarily uniform size and shape therein;
(b) transmitter unit attachment means within said housing means to removably attach a plurality of infrared control transmitter units within said housing means;
(c) more than one infrared photo detectors positioned within said housing means to receive an infrared signal from an infrared control transmitter unit within said housing means and generate an electrical signal analogous to said infrared signal;
(d) amplifier means connected to said infrared photo detectors and cooperating therewith to amplify said electrical signal;
(e) a plurality of infrared emitter devices connected to said amplifier means, driven in unison by said amplifier means, positioned within said housing means in diverging relation, and emitting an amplified infrared signal toward a respective infrared controlled appliance in response to said electrical signal; and
(f) detector reflector means having such a shape and being so positioned on said housing means with respect to said infrared photo detectors as to create a wide acceptance pattern of said infrared photo detectors to infrared signals from an infrared control transmitter unit within said housing means.

20. A console as set forth in claim 19 including:
(a) illuminator means positioned within said housing means and selectively operable to illuminate an infrared control transmitter unit within said housing means.

21. A console as set forth in claim 19 wherein said transmitter unit attachement means includes:
(a) one component of a hook and loop adhesive set positioned on one of said housing means and at least one infrared control transmitter unit; and
(b) the other component of a hook and loop adhesive set positioned on the other of said housing means and at least one infrared control transmitter unit.

22. An infrared remote control unit integrator console system to house a plurality of handheld infrared control transmitter units of not necessarily uniform size, shape, and coding scheme which are operable to selectively emit infrared signals toward infrared controlled appliances having respectively compatible infrared receivers associated therewith, said console system comprising:
(a) console housing means sized ot receive a plurality of infrared control transmitter units of not necessarily uniform size and shaped therein;
(b) transmitter unit attachment means within said housing means to removably attach said pluraltiy of infrared control transmitter units within said housing means;
(c) an infrared photo detector positioned within said housing means to receive an infrared control signal from an infrated control transmitter unit within said housing means and generate a console electrical signal analogous to said infrared control signal;

(d) detector reflector means having such a shape and being so positioned on said housing means with respect to said infrared photo detector as to create a wide acceptance pattern of said infrared photo detector to an infrared control signal from an infrared control transmitter unit within said housing means;

(e) console amplifier means connected to said infrared photo detector and cooperating therewith to amplify said console electrical signal;

(f) radio transmitter means connected to said console amplifier means, modulating a radio signal with said console electrical signal, and transmitting the modulated radio signal;

(g) radio receiver means separated from said housing means, receiving said modulated radio signal, and demodulating same to recover a receiver electrical signal analogous to said console electrical signal;

(h) receiver amplifier means connected to said radio receiver means and amplifying said receiver electrical signal; and (i) an infrared emitter device connected to said receiver amplifier means, converting said receiver electrical signal to an appliance control infrared signal analogous to said infrared control signal, and emitting said appliance control infrared signal toward an appliance associated with said infrared control transmitter within said housing means.

* * * * *